Nov. 9, 1948.   W. D. BUCKINGHAM ET AL   2,453,118
CONCENTRATED ARC DISCHARGE DEVICE

Filed May 8, 1946   6 Sheets-Sheet 1

INVENTORS
W. D. BUCKINGHAM
C. R. DEIBERT
BY   *N. F. Presson*
ATTORNEY

Nov. 9, 1948. W. D. BUCKINGHAM ET AL 2,453,118
CONCENTRATED ARC DISCHARGE DEVICE
Filed May 8, 1946 6 Sheets-Sheet 2

INVENTORS
W. D. BUCKINGHAM
C. R. DEIBERT
BY
*H. F. Presson*
ATTORNEY

Nov. 9, 1948.  W. D. BUCKINGHAM ET AL  2,453,118
CONCENTRATED ARC DISCHARGE DEVICE
Filed May 8, 1946  6 Sheets-Sheet 3

INVENTORS
W. D. BUCKINGHAM
C. R. DEIBERT
BY
ATTORNEY

INVENTORS
W. D. BUCKINGHAM
C. R. DEIBERT

BY

ATTORNEY

Patented Nov. 9, 1948

2,453,118

UNITED STATES PATENT OFFICE 2,453,118

CONCENTRATED ARC DISCHARGE DEVICE

William D. Buckingham and Clarence R. Deibert, Southampton, N. Y., assignors to The Western Union Telegraph Company, New York, N. Y., a corporation of New York Application May 8, 1946, Serial No. 668,092

25 Claims. (Cl. 250—27.5)

This invention relates generally to arc discharge devices, including arc lamps, rectifiers, current-regulating apparatus and the like, and more particularly to a device of this character which operates with a highly concentrated arc discharge as distinguished from a low-pressure diffused or glow discharge.

This application is a continuation-in-part of our copending application Serial No. 501,052, filed September 3, 1943, now abandoned; the instant application is for the purpose of setting forth new discoveries in regard to the characteristics, theory and manner of operation of the discharge device, and also to include various improvements in the structure and method of making the same.

An object of the invention is a concentrated arc lamp having various new operating characteristics, more particularly in the field of "point" light sources, i. e., highly concentrated source of high intrinsic brilliancy, and in which there is little or no tendency of the arc discharge to "wander" from one point to another on the cathode surface.

Another object of the invention is an improved method and means to prevent or minimize disintegration of the emissive cathodes in an arc discharge device and to renew the active surface area during operation of the device, thereby appreciably to increase the life thereof.

A further object is to produce, by means of an arc, a highly concentrated "point" source of light useful for narrow-beam and high-intensity projection applications.

An additional object of the invention is to obtain a light which is distributed over the visible range in a continuous spectrum, in a manner similar to a tungsten filament lamp, but which is many times brighter and which has a cosine type of spatial distribution.

A further object is an improved light source which may be modulated at high frequencies and over a wide frequency band.

Other objects and advantages of the invention will be apparent from the following detailed description of the preferred embodiments thereof shown in the accompanying drawings, in which.

Figure 19:
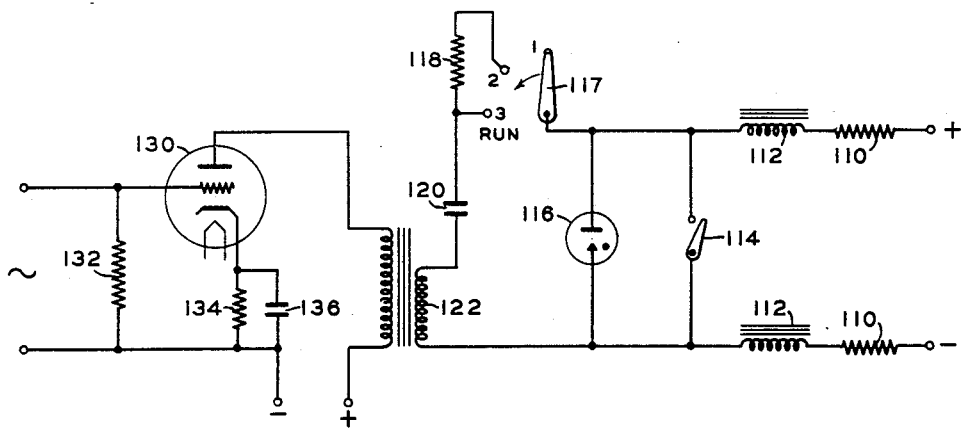
Figure 20:
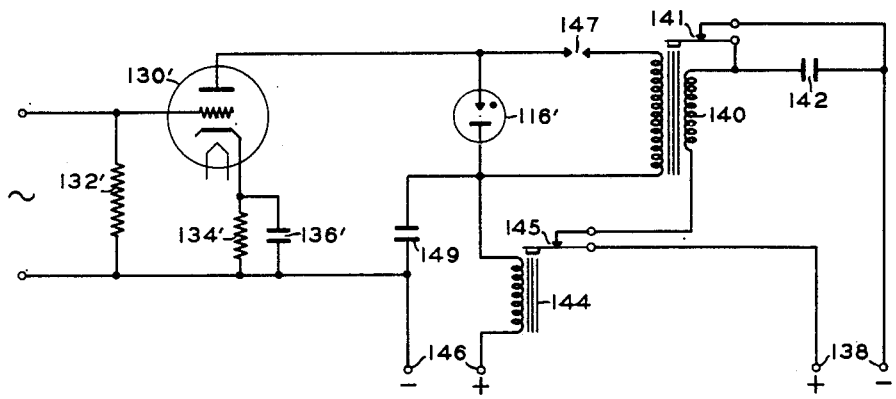
Figure 22:
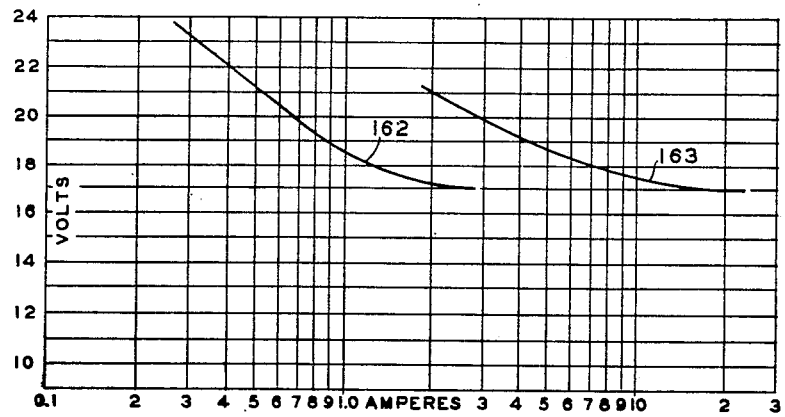
Figure 23:
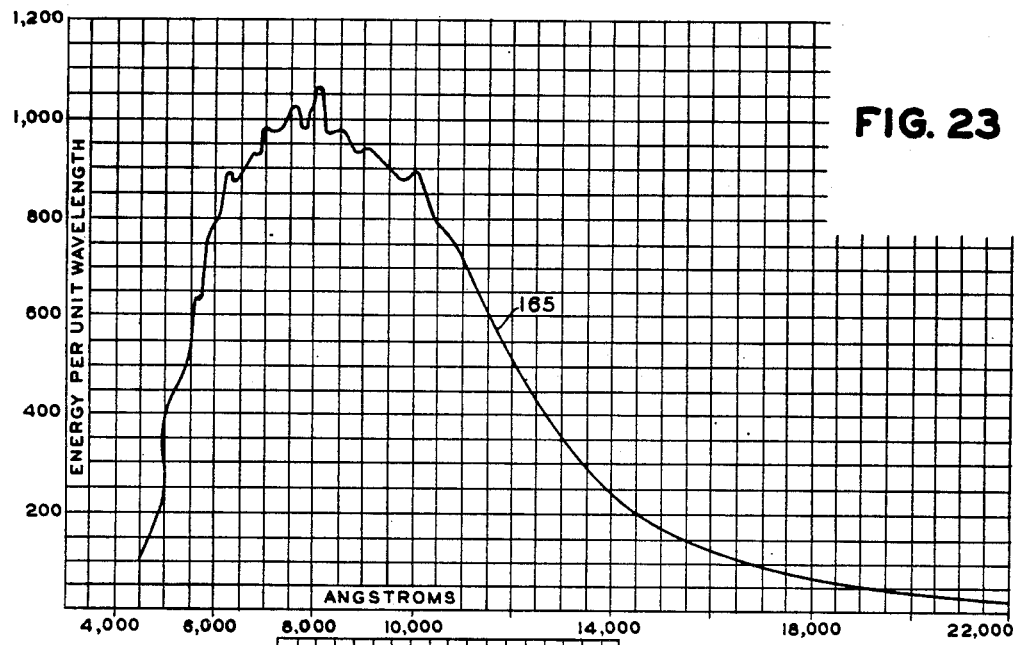
Figure 21:
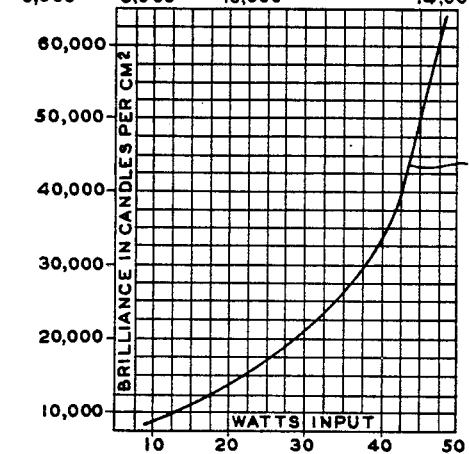
Figure 24:
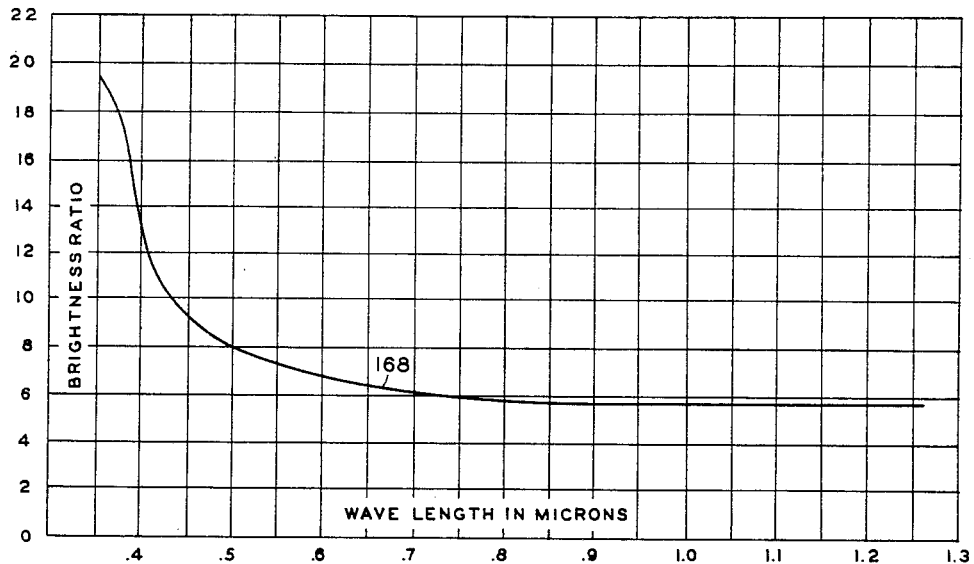
Figure 25:
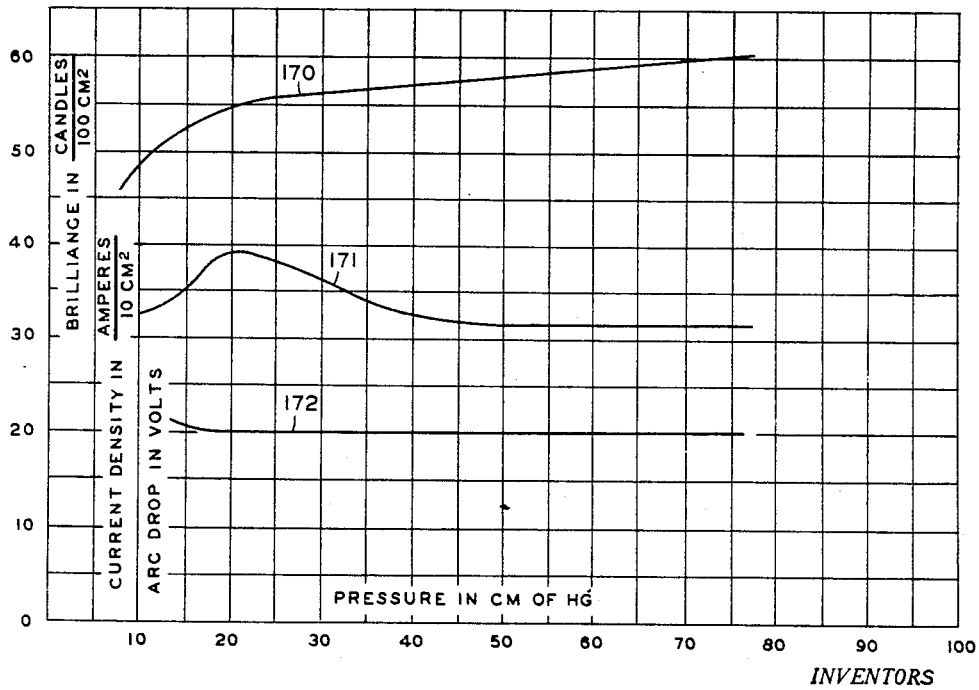
Figure 26:
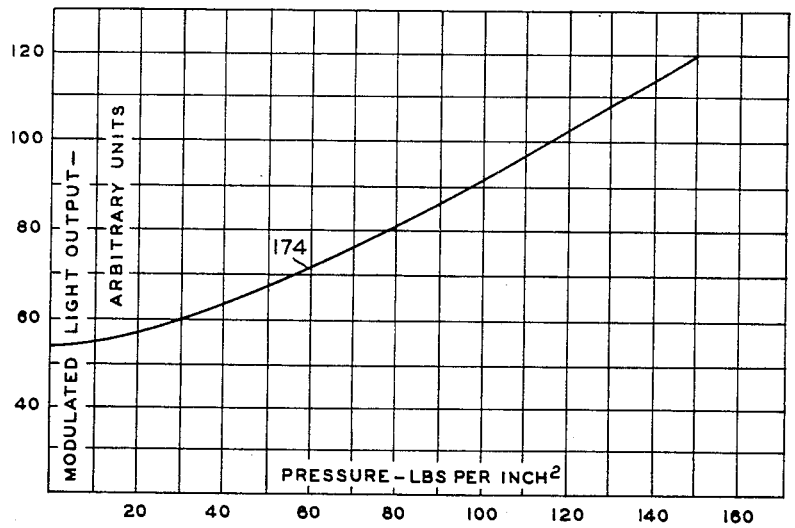
Figure 27:
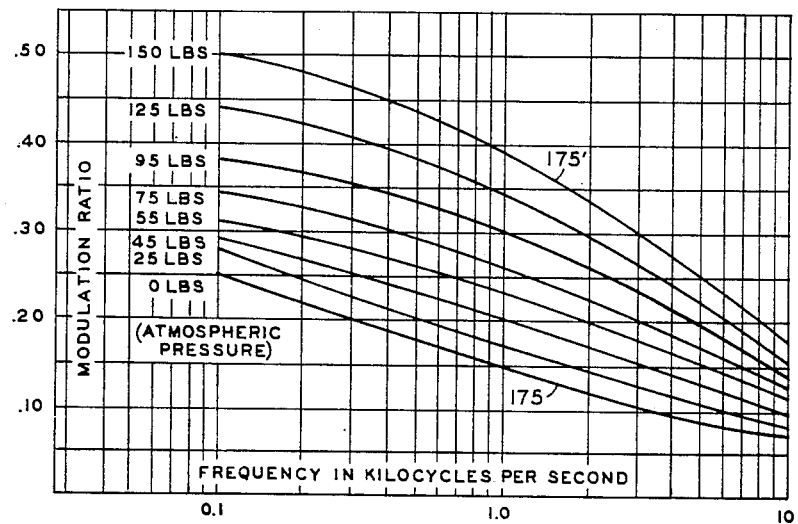

Figs. 19 and 20 respectively illustrate modulating circuits adapted for use with concentrated arc lamps of different sizes;

Fig. 21 is a graph showing the relation between power input and brilliance of the brightest portion of the arc at the cathode of a lamp constructed in accordance with one form of the invention;

Fig. 22 is a graph showing the relation between the current and the terminal voltage of the arc of two such lamps of different sizes;

Fig. 23 is a graph showing the radiation characteristic of the arc in an atmosphere substantially of argon;

Fig. 24 is a graph showing the brightness ratio of the lamp for different wave lengths of light;

Fig. 25 shows curves illustrating the brilliance in candles, the current density and the arc drop obtained with different degrees of pressure of the filling gas in the lamp;

Fig. 26 shows graphically the modulated light output with different degrees of pressure of the filling gas; and Fig. 27 is a logarithmic chart of curves showing the modulation ratio at various gas pressures over a band of frequencies.

In the arc discharge devices disclosed herein, it is possible to maintain an arc from a point on a metallic cathode with a much greater current density at the surface of the cathode than has heretofore been obtainable, either with a thermionic arc or with a cold cathode arc of types heretofore known. The cathode end of the arc is restricted in cross-section and impinges only upon a small area of the cathode surface, and results in a current density which will give a luminosity of an extremely high order, for example, of the order of 50,000 candle power per square centimeter of cathode surface, although the usual commercial forms of the lamps produce approximately 10,000 candle power per square centimeter. Moreover, there is provided a sharply defined "point" light source since the concentration of the arc is maintained upon a minute area of the cathode and forms an intensely concentrated light spot on or adjacent to the cathode, and there is little or no tendency for the "point" light source to wander over the surface of the cathode, so that there is no variation or change in the configuration or position of the arc thus formed.

The intensity of the "point" light source formed at the cathode is proportional to the power traversing the arc, and the light radiated may be rapidly varied or modulated in intensity in accordance with variations in the power traversing the arc, and thus the arc may be modulated at high frequencies. Therefore, the lamp is especially adapted for signaling; for photographically recording or reproducing speech and other variations; for the optical transmission and reception of various types of signals, speech variations and other sounds; and for the detection, amplification and projection, upon a screen or other medium, of various conditions or characteristics of devices and materials which it is desired to ascertain.

Figure 1:
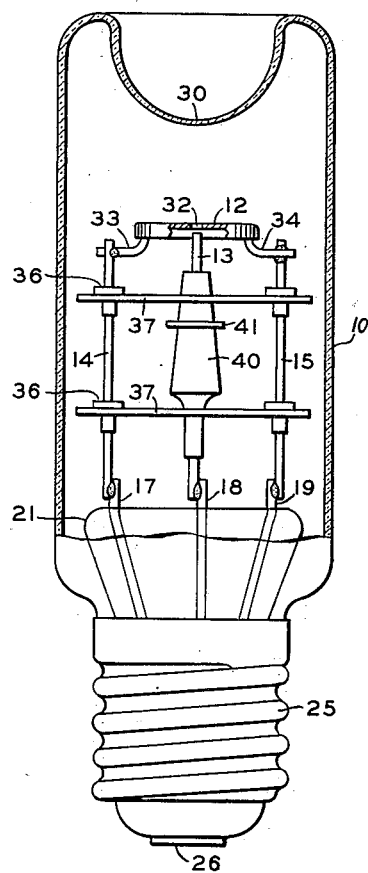
Fig. 1 is a view, in elevation, of a lamp constructed in accordance with the invention.

Referring to Fig. 1 of the drawings, the embodiment of the lamp there illustrated comprises a sealed envelope 10, composed of lime glass, or a higher melting point glass, or quartz or other suitable heat-resistant material, depending upon the wattage of the lamp. The envelope encloses two spaced electrodes 12 and 13, the electrodes being supported by a suitable arbor structure which, for example, may include conductive supporting rods or posts 14 and 15 of nickel, iron, tungsten, tantalum, molybdenum and like high melting point metals that are easily degassed and cleaned, and a cathode pencil or wire 13 hereinafter referred to in detail, the rods being welded, brazed or otherwise mechanically and electrically secured to lead-in wires 17, 18 and 19 that pass through and are supported by the press 21 of the lamp, the lead-in wires being hermetically sealed in the press in known manner. The two outer rods 14 and 15 and the lead-in wires 17 and 19 form one side of the lamp circuit, and are connected together to one of the terminals of the lamp, such as the screw shell 25. The other rod 13 and lead-in wire 18 are connected to the other terminal 26 of the lamp. A screw-base type of lamp is illustrated, since it conveniently may be inserted into a standard electric light socket, although it will be appreciated that any desired form of lamp base and terminals may be employed. Also, any suitable arbor structure may be used for supporting the electrodes 12 and 13.

The envelope 10, which is firmly cemented to the base 25, has had all air evacuated therefrom, after which the lamp was filled with a suitable gas of a character, and in the manner, hereinafter set forth. Preferably, although not necessarily, to prevent any irregularities in the distribution of light emitted by the lamp of Fig. 1, because of irregularities or striations of the glass of the envelope, the end or window 30 thereof has been reheated and caused to be forced inwardly, in known manner, thereby to provide in the area 30 a much thinner and more uniform section of glass than is present in the remainder of the envelope 10, due to the section 30 being appreciably elongated or stretched during the operation. This insures that the window will be very thin and uniform in thickness, thereby avoiding striation of the light ray projected through the window. The window preferably is blown in the bulb before its assembly with the stem and electrodes.

Figure 3:
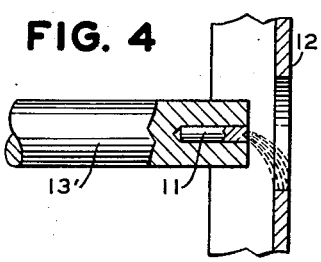
Fig. 3 is an enlarged fragmentary view showing certain details of one form of the electrodes employed.

Referring particularly to Fig. 3, which is an enlarged view of one form of the electrodes, the outer pencil of the cathode comprises a tantalum wire or rod 13', although other of the higher melting point metals having good electrical and thermal conductivity may be employed, such as tungsten, molybdenum, platinum, and the like. The mass and thermal conducting characteristics of the outer pencil are such that it does not become heated to the stage where it is electron emitting to an appreciable extent. The outer pencil may also be formed from a non-metallic substance having good electrical and thermal conductivity, such as carbon or graphite. In the particular embodiment illustrated, which is for use with a small size lamp, for example, a 2-watt lamp, the wire 13' is approximately 20 mils in diameter, and in the end of the wire a small hole, approximately 3 to 5 mils in diameter, has been drilled, although as hereinafter disclosed there are various other methods of forming the cathode pencil.

The hole thus drilled, which in the embodiment shown in Figs. 3 to 5 of the drawing extends inwardly a distance of approximately 20 mils from the end of the wire 13', is filled with an electron emissive material that is inserted and treated in a manner hereinafter disclosed, so as to form the cathode 11. The filling material, when properly treated or activated, has the characteristics of being a good electron emissive substance at very high temperatures; it is chemically stable, and has a suitably high melting point and a high boiling or vaporization point. Apparently an important characteristic of a substance which will give optimum results is that it is not a sufficiently good electron emitter at lower temperatures to cause electrons to be emitted in sufficient quantity to support an arc of high current density until the material has reached incandescent temperatures, above the melting point of the base metal of which the substance is composed. Another characteristic is that the melting point of the metallic oxide or other metallic compound should be higher than the melting point of the base metal. Preferably, zirconium or zirconium oxide is employed as the electrode material, although various other substances having the foregoing characteristics may be employed, for example, the oxides of calcium and hafnium, and zirconium carbide. Zirconium oxide is preferred because when treated in the manner hereinafter disclosed, the active surface area of the cathode exhibits electron emissive properties to a degree heretofore thought unobtainable under operating conditions. It will be understood that the foregoing substances may be mixed, if desired, and that they may be combined with other known electron emissive substances to form the core 11, and that for certain purposes other known substances having similar electron emissive characteristics and chemical stability may be employed in lieu of those specifically referred to.

The oxides above mentioned all have very high melting and boiling points, their melting points ranging from about 2500° C. to 3000° C., and their boiling points ranging considerably higher; the melting points of their bulk metals are very much lower. The carbide of zirconium melts at 3532° C. and boils at 5100° C., and zirconium metal melts at approximately 1900° C. and boils at 2900° C.

The anode 12 is composed of a suitable metal or alloy, for example, nickel, iron, cobalt, molybdenum, tantalum, tungsten and the like, the electrode illustrated being disc-shaped and having an opening or sight 32 therein, properly aligned with respect to the window 30, the end of the cathode 11 being positioned in alignment with the opening 32. The diameter of the hole 32 is substantially the same as, or slightly greater than, the diameter of the cathode pencil 13, the diameter of the hole 32 in the embodiment shown being approximately 30 mils. The end of the cathode pencil may be spaced a slight distance, for example, 1/64 of an inch, back of the anode, but it may be extended to enter the hole 32, in which latter case the hole would be made sufficiently large in diameter to provide proper spacing between the end of the pencil and the anode to produce the desired arc. In Fig. 1 the anode is directly supported by two curved nickel rods 33 and 34 which are welded or brazed to the anode and the rods 14 and 15, respectively.

The anode serves to locate and fix the positive end of the arc stream. It must dissipate the heat released there without getting hot enough to vaporize or to produce any considerable radiation due to its own incandescence, even at the point at which the arc stream strikes. This requires that the anode be of ample size and so proportioned that heat will be conducted away rapidly from the point of arc contact, since if any part of the anode becomes hot enough to vaporize, the vapor so released will migrate to the cathode and in time spoil the lamp.

Tungsten, tantalum, and molybdenum commonly are used for anodes because of their high melting temperatures. Of these, however, tantalum has relatively low thermal conductivity; tungsten makes excellent anodes but is difficult to work; and thus molybdenum is preferred for the anode structure.

Figure 2:
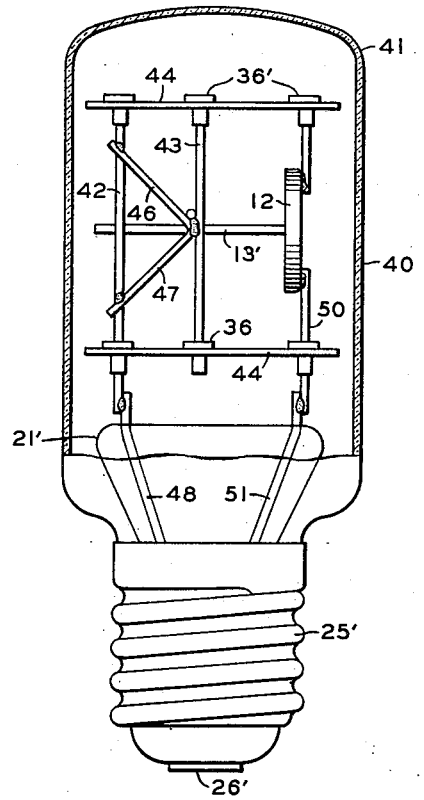
Fig. 2 is a view, in elevation, of a modified form of lamp embodying the invention.

The exact shape of the anode is not important, and it may comprise simple disks or flat rectangular plates or other configuration. As illustrated in Figs. 1 and 2, the anode may be shaped so as to serve as a supporting framework for the lamp elements, the elements being arranged so that the arc strikes to the edge of a hole in the center of the anode. This construction fixes the position of the arc in the center of the anode where maximum heat transfer is obtained, and the hole provides a window for the emergence of the light beam from the cathode. Lamps larger than 300 watts may employ water-cooled anodes where the amount of heat to be removed is greater than can be dissipated by reasonable sized anodes of the non-water-cooled type.

Surrounding the posts 14 and 15 are circular bushings 36 of a material such as nickel or the like, the tubes fitting over the posts with a tight fit or otherwise secured thereto so as to maintain their proper positions. The bushings 36 are received within holes in the insulating cross braces 37, the bushings passing through and engaging the holes in the braces 37 with a tight fit so as to secure the braces firmly in position. Over the central wire 13 is an insulator piece 40 which is passed through holes in the braces 37 and is firmly positioned thereby, the insulator piece 40 in turn firmly positioning the wire 13 and electrode 11 with respect to the anode 12. The insulator piece 40 may be made in longitudinal sections which are secured together and in intimate contact with the wire by means of a resilient washer or ring 41 that is slipped along the tapered surface of the insulator piece until it grips the same with the proper resiliency or tension.

While nothing has been found that is better than zirconium oxide for the active material of the cathode, the processing of the oxide has been improved. All such oxide contains some impurities which, when vaporized by the concentrated arc, tend to condense on and darken the glass envelope. The first improvement was obtained by heating the oxide to approximately 2500° C. in an induction furnace. More complete purification, however, is secured when the oxide is actually fused into a colored glass in a carbon arc operated in air. The glass thus formed is very hard and brittle. It is then ground to pass through a 350° mesh screen and the resulting powder used to pack the cathodes. In addition to running cleaner, this material shrinks less and produces lamps with longer lives and much greater efficiency.

Figure 4:
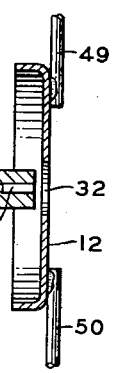
Fig. 4 is an enlarged fragmentary view which indicates the concentrated point source of light in the arc obtainable with the lamp of the invention.

In the form of cathode structure shown in Figs. 3 and 4, the zirconium oxide powder, treated as above set forth, is packed into the hole in the cathode pencil 13', the material being dampened somewhat to assist in causing it to pack. After the hole has been filled to the top thereof with the zirconium powder, the assembly is inserted within the glass envelope of the lamp. The envelope and assembly are connected to a vacuum pump and heated in an oven to a temperature of approximately 900° F., the heating being effected while the envelope is evacuated to as high degree as practicable, for example, evacuated down to a fraction of a micron of mercury pressure. The envelope and assembly are removed from the oven, while maintaining the high vacuum thereon, and treated further to assure the degassing of the various parts, which includes heating the envelope and bombardment of the electrodes and all metal parts in the tube, as by inserting the envelope and assembly within a high frequency coil for heating and treating the same. Next, the envelope preferably, although not necessarily, is filled with hydrogen at approximately atmospheric pressure, and a direct current arc is established between the cathode and anode, which arc heats the cathode and in the presence of the hydrogen, cleans the cathode and may to some extent activate the core of the cathode in a manner hereinafter described. The hydrogen is then pumped out and the electrodes are again bombarded to release the occluded hydrogen.

After the heating and degassing operations referred to above, the envelope is filled with a suitable gas or vapor which is inert with respect to the material of the electrodes, such as neon, argon, krypton, xenon, hydrogen, mercury vapor, helium, nitrogen, carbon dioxide, or mixtures thereof. The particular gas or vapor or combination thereof employed will depend generally upon the particular spectrum which it is desired to produce. The gas pressure in the envelope may be of the order of several centimeters up to several atmospheres, depending upon the particular gas employed and the purpose for which the lamp is to be used, as hereinafter stated. The bulb is then sealed and taken off the pump.

The next step is to activate or form the cathode. After the envelope is evacuated it is preferably filled with argon to almost atmospheric pressure.

Figure 5:
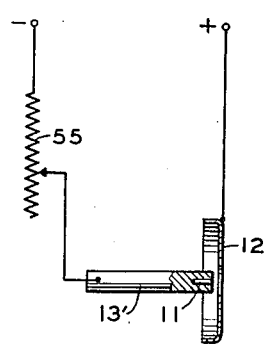
Fig. 5 shows a circuit arrangement employed for activating or forming the cathode.

The cathode is then formed, as indicated in Fig. 5, by connecting the anode 12 and cathode 13' of the tube in circuit with a suitable source of direct current power of adjustable potential, for example, such that potentials up to 1000 volts may be obtained. In one side of the circuit there may be connected a variable resistance 55 arranged so that the resistance may progressively be reduced if desired. Starting with a high value of resistance in the circuit the voltage is usually increased until an arc or discharge appears. The arc strikes between the anode and the metallic rod or tube of the cathode. After a few seconds, the cathode tube becomes red hot and heats the zirconium oxide packed in it to a temperature where the oxide becomes electrically conductive. The arc then strikes between the anode and the oxide and raises the temperature of the surface of the oxide to or above its melting point of approximately 3000° C. The molten oxide on the surface flows and bonds itself to the sides of the metal tube, forming a smooth glassy surface on the end of the cathode material 11.

In the molten state and under the intense ionic bombardment of the arc some of the zirconium oxide is reduced or decomposed to metallic zirconium forming a very thin layer of this metal over the surface of the cathode. Zirconium metal is a better electron emitter at high temperatures than is the oxide, and it also has a lower melting temperature, thus, as soon as the metallic zirconium surface layer is formed, the temperature of the cathode drops slightly, and the underlying oxide solidifies and supports the film or cap of molten metal on its surface. It is this film of molten metal which appears to be the chief source of the visible radiation from the lamps. The film, once formed during manufacture, remains to be heated and to become incandescent whenever the lamp is relighted. It is so thin that surface tension holds it to the oxide backing so the lamps may be burned in any position.

This light source, which chiefly comprises a thin metallic film supported by a refractory backing, has several unique advantages. Ordinary tungsten filament lamps can be made to give more light if burned hotter, the radiation increasing as the fourth power of the absolute temperature. A small increase in temperature thus produces a comparatively large increase in radiation. This process is limited, however, in the tungsten filament lamp by the melting point of tungsten, for if it is reached or even closely approached the lamp quickly burns out. Concentrated arc lamps of the character disclosed herein are not so limited. In these lamps, the incandescent metallic light source can be operated and is operated at a temperature which is above the melting point of the metal, thereby producing light of a color quality similar to that which would be emitted by tungsten if it could be operated at a temperature at or slightly above its melting point.

A second advantage of the concentrated arc lamp is its life characteristics when operating at these high brilliancies. As the temperature of the filament of a tungsten lamp is increased, lamp life decreases because of evaporation of the filament material. Since the metal source of the concentrated arc lamp operates in a molten condition, it might be expected that it, too, would evaporate. Spectrograms taken of the portion of the arc stream very near the cathode show the presence of very strong zirconium lines. This indicates that some evaporation of free zirconium occurs and under the excitation of the arc the characteristic spectrum is emitted. It is found, however, that in addition to the normal zirconium spectrum, the singly and doubly ionized zirconium spectra are also present. Furthermore, there is practically no zirconium found in any portion of the arc stream except that portion which is within a few thousandths of an inch from the cathode surface.

It is believed that these phenomena are explained as follows: An atom of zirconium gains sufficient energy to leave the cathode surface and enters the cathode glow region of the arc which extends for a few thousandths of an inch from the cathode surface. Here, under the intense ion bombardment, the zirconium atom has one or more electrons knocked off of it, or in other words, it is ionized. In the normal atom, the positive nuclear charge is just balanced by the negative charges of the surrounding electrons so the atom as a whole is neutral. When electrons are removed, as in the ionized atom, the atom is left with a positive surplus and thus has a positive charge and is attracted and drawn back to the negative cathode it just left. If any zirconium atoms do escape permanently from the cathode, they are replaced by reduction of the underlying oxide. As a result of these processes the lamps have lives which are measured in many hundreds of hours.

The cathode-current densities in the concentrated arc lamp vary from about 250 amperes per square centimeter for a 100-watt lamp to about 900 amperes per square centimeter for a 2-watt lamp. Assuming the electron emitter to be the thin zirconium layer at a temperature slightly below the melting point of the oxide, and using the constants commonly given for a zirconium filament in a vacuum, values of electron emission are obtained which are of the order of 500 amperes per square centimeter. This value is entirely in line with the actual current densities found in the lamps and seems to confirm the present belief that the arc is maintained substantially by thermionic emission, and that the active surface of the cathode consists of a thin layer of zirconium atoms at a temperature considerably above the normal melting point of the bulk metal.

The radiation from the lamp appears to be divided into three parts as follows:

1. Continuous radiation from the molten cathode surface.
2. Line radiation from the excited gas and vapor.
3. Continuous radiation in the spectral region from at least 3500 Angstroms to 5000 A., originating in the excited gas and vapor.

The existence of the three types of radiation have been shown by spectrograms, with exposures made from the cathode spot, cathode glow and anode glow portions of the arc of a specially constructed 100 watt lamp. These show that the cathode spot is by far the brightest portion. Even though the exposure time for the three traces varied in the ratio of 1:10:100, it was found that the trace of the cathode spot area is more than ten times as intense as that of the cathode glow area.

The cathode spot formed on and adjacent to the surface of the outer fused cap or film of zirconium was known to emit argon and zirconium line spectra and a strong continuum. The continuum formerly was thought to be caused principally by recombination or by some other unexplained phenomenon, since its brightness was far greater than would be expected from zirconium even at its melting point of approximately 1900° C. or zirconium oxide at its melting point of approximately 2950° C. to 3000° C. Moreover, the fact that the light could be modulated at high frequencies seemed to rule out simple thermal brilliance. Another difficulty was that zirconium at its melting point or zirconium oxide at its melting point has thermionic emission properties which could account for only a portion of the arc current, and the current densities were far above those obtainable from the usual thermionic or emitter materials. The balance of the current was thought to be due to field emission from the cathode surface.

Attempts to identify the material of the cathode surface were hampered by the extremely small amount present, well below the quantity required even for microchemical analysis, and no clear identification was possible even when the material was analyzed by the spectrograph, or by X-ray and electron diffraction. With the development of larger lamps, such as 1000 watt lamps, larger formed cathode surfaces became available and from these a chemical analysis was made. This indicated that the gold-colored surface film which is frequently present on a newly formed cathode was zirconium nitride ZrN.

Other lamps have been made using various forms and compounds of zirconium and other related materials as cathode fillings without finding anything which approaches the efficiency of zirconium oxide as a light producer, with the exception of hafnium oxide. The latter, however, is not so practical because of its comparative rarity and high cost. Solid and powdered zirconium metal cathodes have been operated in various gases and gas mixtures but the results were not as good as those obtained with the oxide. When nitrogen was used with zirconium metal, the gold-colored zirconium nitride was formed, but the light emitting properties were not so good as desired. Somewhat better results were obtained by using a thin layer of powdered zirconium nitride over zirconium oxide. But even these lamps were inferior to those whose cathodes were composed originally of nothing but the oxide. Other lamps were then made in which various getter materials were used in an attempt to eliminate all nitrogen prior to the forming of the zirconium oxide cathodes, to see if nitrogen was essential. Apparently, it is not since all of these lamps formed and operated normally, the only noticeable difference being that the cathodes were gray instead of gold-colored.

The color of the freshly formed cathode surface varies considerably even in the normal production run of lamps. A newly formed surface may be transparent and glassy, milky white, metallic gray, black, or gold-cold, with the gold color occurring more frequently. After a few hours of operation most cathodes become metallic gray, but a few remain gold-colored. All appear to work equally well. Newly formed cathode surfaces also vary widely in their electrical conductivity when tested after removal from the lamps. The gold-colored and metallic gray surfaces are good conductors, but the white, black and glassy surfaces range from only fair conductors to insulators when cold, although obviously they are conductors at the operating temperatures of the lamp.

Examination of longitudinal sections of newly formed cathodes under the microscope has shown that the fused, gold-colored cathode surface cap or film may be as little as 0.00005 inch thick. Immediately beneath this surface a layer of a black, semi-fused material of poor electrical and thermal conductivity extends for a few hundredths of an inch, merging gradually into the white powder of the original oxide. Cathodes taken from lamps which have run many hours show much thicker fused layers. A number of lamps have been operated with the filling gas at high pressures; during operation of these lamps it was found that gray-metallic and sometimes gold-colored crystals formed around the edge of the cathode spot, fusing and apparently flowing into the cathode surface when touched by the arc stream.

In some cases, if the cathode is allowed to cool shortly after being formed, it has the appearance of a glass bead. Presumably this is simply the fused oxide. As mentioned above, however, it more often has a gray-metallic appearance. In this case, probably some of the oxide has been reduced to metallic zirconium. In the case of gold-colored films, it is thought that some of the zirconium has combined with nitrogen atoms present as an impurity to form zirconium nitride.

It seems certain that, due to ionic bombardment of the cathode surface, the oxide fuses and some reduction occurs. This reduction may be due to one or more possible causes, namely: (1) thermal decomposition of the oxide, (2) chemical reduction due to the presence of some foreign substance, (3) electrolytic reduction, (4) decomposition due to ionic bombardment.

It appears, therefore, that the concentrated arc lamp emits radiation from two main sources, viz., the white hot zirconium cathode surface and the cloud of excited zirconium vapor and argon or other filling gas in the cathode glow region which extends for a few thousandths of an inch from the cathode. The portion which originates from the cathode surface has a continuous spectral distribution, and extends in measurable amounts from 2500 A. in the ultraviolet, through the visible, reaching a maximum near 10,000 A. and on into the infrared. That portion of the radiation which comes from the cloud of excited vapor and gas shows three principal spectra: a continuum extending from the ultraviolet to about 5000 A., the normal, singly and doubly ionized zirconium spectrum, and the normal and singly ionized argon spectrum. Radiation shorter than 3000 A. or longer than 5 microns is not transmitted by the type of glass used for the bulbs of standard type lamps.

From the foregoing it is apparent that the following characteristics are essential to produce the desired results:

(1) The formation and maintenance of an incandescent film or pool of a good thermionically emissive metal or metallic compound on the active surface area of the cathode when the lamp is operating; (2) directly beneath and supporting the pool is a compound of the metal, preferably an oxide, or other refractory substance, that has a considerably higher melting point than the metal or metallic substance on the surface; (3) the oxide or other refractory substance has comparatively low thermal conductivity so that it acts as a heat insulator; and (4) a strong electric field is established in the vicinity of the cathode whereby the surface metal or metallic compound that is vaporized during operation of the lamp becomes ionized and positively charged and returns and condenses on the cathode surface, thereby renewing the active surface area.

As hereinbefore set forth, an important characteristic of the metal or metallic compound which forms the active surface area of the cathode is that it is not a good electron emitter at temperatures substantially below the high operating temperature of the lamp, thereby to prevent the emission of electrons in sufficient quantity to support the high current density arc until the high operating temperature necessary to give a light source of the desired brightness has been reached. If the compound were a good electron emitter at lower temperatures, the desired high operating temperature and resultant brilliant light source would not be attained.

If a reducible oxide of the same metal is used to support the pool on the surface, this provides a reserve supply and greatly increases the life of the lamp.

The diameter of the cathode spot of a given lamp depends upon the current. If the current is increased, its spot grows larger, taking several seconds to adjust itself to the new condition. While the lamps are designed to operate at a definite current value, it is possible to adjust the spot size by changing the current. One of the principal advantages of the concentrated arc is its high brightness; the maximum brightness of standard forms of these lamps at their normal operating current varies between 40 and 100 candles per square millimeter in sizes ranging from 2 to 100 watts. To the eye the cathode spot appears to have a uniform and constant brilliance, although measurements show that the brightest part is near the center. The candle power increases with the current, maintaining an almost linear relationship over a very wide range. The efficiency of the lamps, as measured in candle power per watt input to the lamp, varies between 0.15 for the 2 watt lamp to 0.8 for the 100 watt lamp. The spatial light distribution about the axis of the cathode shows that the arc lamps have a cosine distribution, that is, the quantity of light emitted in a given direction may be calculated by multiplying the maximum candle power by the cosine of the angle between the axis of the cathode and the direction considered.

The concentrated arc lamps have a negative volt ampere characteristic and consideration must be given to this fact in the design of their power supply. The lamps are started with a high voltage which breaks down the gap in the lamps, and usually are run from a rectifier or direct current generator or battery with sufficient ballast resistance in series to limit the current to its normal value. The lamps may be made with multiple anodes which permits their operation from an alternating current supply, in which case the lamps act as their own rectifiers. Two watt lamps preferably have applied thereto potentials of the order of 1000 volts for quick starting and preferably 130 volts for running. Larger lamps preferably are supplied with a starting voltage of the order of 2000 volts, and may be run from sources supplying from 24 volts up, high supply voltages resulting in more stable operation. The A. C. type of lamps are frequently started without the use of high voltages by the aid of an auxiliary tungsten filament which is built into these lamps to furnish the initial ionization required to break down the gap and establish the arc.

When the arc strikes to the tip of the electrode core 11, a cathode spot of intense brilliance is formed at the end or tip of the core and results in the formation and maintenance of a minute crater at this point, as seen in the enlarged view in Fig. 4. The cathode spot has an affinity for the minute activated crater, and there is no appreciable "wander" of the cathode spot.

The mass of the tantalum comprising the rod 13 or 13' is such that it does not become heated to the stage where it is electron emitting to an appreciable extent or at least to an extent such that it tends to affect the cathode spot. As hereinbefore stated, various materials having good electrical conductivity other than tantalum may be employed, provided they are sufficiently hard as in the case of carbon, or have sufficiently high melting points in the case of metals, and have good thermal conductivity so that the heat will flow away from the vicinity of the cathode spot at a rate to prevent the material of the rod 13 from becoming electron emitting to a deleterious extent. However, the heat should not be conducted away from the core 11 at such a rate that it cools off the core too much and thereby reduce its electron-emitting efficiency.

Notwithstanding the intense concentrated arc obtainable with the lamp, the required power input is small. For example, if a direct current of 150 volts is impressed across the lamp when it is started, the initial amount of current required is quite small, in the neighborhood of 5 milliamperes in a lamp of the size illustrated in Fig. 1, and as soon as the cathode spot is formed, the voltage will drop to the neighborhood of 40 volts with a current of approximately 100 milliamperes flowing through the electrodes. Thus, both the starting and operating currents are exceedingly small and yet are sufficient to produce a cathode spot of intense brilliancy.

Fig. 2 shows a modification of the lamp structure in which the window 40 is in a side of the envelope 41. In this structure the supporting arbor comprises metal rods 42 and 43 which are received within circular bushings 36', the bushings passing through openings in the insulating cross braces 44 to secure the cross braces in position. Braces 46 and 47 are each brazed or welded at one end to the rod 42 and at their abutting ends are similarly secured to the wire 13' and the rod 43. The rod 42 is brazed or welded to a lead-in wire 48, the circuit to the cathode 13' including rods 46 and 47 which are connected to rod 42, the rod 13' being brazed or welded at the juncture of the rods 43, 46 and 47 and also preferably welded or brazed to the rod 42.

In the form shown in Fig. 2 the anode 12 is secured in position by being welded or brazed to rods 49 and 50, the rod 50 being welded or brazed to the lead-in conductor 51. The lead-in conductors 48 and 51 are respectively connected to the electrodes 25' and 26' of the lamp.

Figure 6:
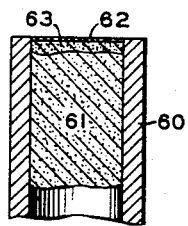
Figs. 6 to 9 are enlarged fragmentary views of different forms of tubular cathode structures which may be employed.
Figure 7:
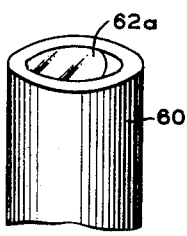

Figs. 6 and 7 are enlarged fragmentary views of a cathode pencil formed from a tube 60 of tantalum, molybdenum and the like, into which was packed a suitable cathode material such as zirconium oxide. The surface cap or layer 62, Fig. 6, is supported by the semi-fused dark layer of zirconium oxide 63 immediately beneath, and this layer merges into the white powder 61 of the original oxide. Fig. 7 shows the glassy cathode spot 62a which is bonded to and makes electrical contact with the inner wall of tube 60, and which forms a thin molten incandescent pool when the lamp is in operation. The oxide powder 61, and also to some extent the semi-fused layer 63, thermally insulate the active surface layer 62 to the extent that it reaches a temperature which is much higher than the melting point of the metal of which the oxide is composed.

Figure 8:
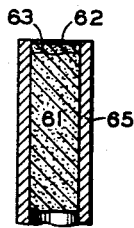

Fig. 8 shows an improvement in which the tube 65 was drawn down to a smaller diameter after the powdered cathode material had been inserted therein. This results in better packing of the oxide, with substantially improved operating and life characteristics.

Figure 9:
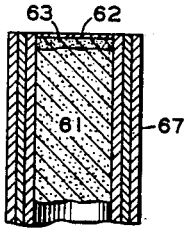

Fig. 9 shows a convolute construction of the tube 67; this assists in thermally isolating the cathode material 61, and causes the surface layer 62 of the cathode to operate at higher temperatures and with increased light emission.

Figure 10:
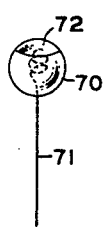
Fig. 10 shows a cathode in the form of a ball.
Figure 11:
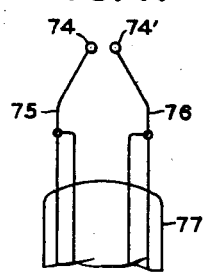
Fig. 11 illustrates this type of electrode which may operate alternately as an anode and a cathode.

Fig. 10 is a further development for thermally isolating the active material of the cathode. In this form, a spherical ball 70 of active material, such as zirconium oxide, is formed around and supported on the end of a wire 71 of small diameter of tungsten, tantalum, molybdenum, platinum or the like, which serves as the leading-in conductor for the electrode. The end of the conductor preferably is coiled within the oxide ball, as indicated in dotted outline, for the purpose of holding the oxide material better, and the end of the coil is close to the glazed circular cathode spot 72 so as to facilitate striking of the arc. For a 10 watt lamp the diameter of the ball may be as small as 0.010 of an inch. There is but little thermal conduction from the ball, and the molten incandescent pool 72 may operate at a very high temperature which, however, is less than that of the melting point of the supporting oxide. The outer surface portion of the ball, apart from the cathode spot 72, is a semi-fused mass of the oxide. Fig. 11 shows the spherical construction for alternating current operation, the balls 74 and 74' being supported by leading-in conductors 75 and 76 which are similar to the conductor 71 of Fig. 10, and are supported by the press 77 of the tube. The electrodes 74 and 74' alternately operate as anode and cathode during operation of the tube, and each has a glazed circular cathode spot formed thereon similar to the spot 72 in Fig. 10.

Figure 12:
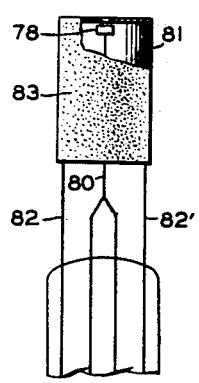
Figs. 12 and 13 show other forms of electrode structures.

In Fig. 12 the cathode 78 is supported on a leading-in conductor 80 of tungsten, molybdenum or tantalum wire to reduce thermal conductivity, and in addition the cathode is surrounded by a cylindrical anode 81, supported by its leading-in conductors 82, 82', and the heat from the anode holds the temperature of the cathode to a very high value. If desired the outer surface of the anode may be coated with a layer 83 of zirconium oxide or other substance of low thermal conductivity to further heat insulate the structure.

Figure 13:
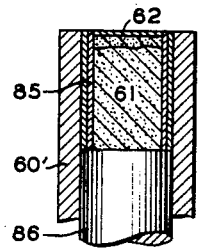

Fig. 13 shows a short laminated or convolute sleeve 85 of tantalum or molybdenum which is inserted within the outer cathode pencil 60' to reduce the thermal conduction from the zirconium oxide core, and this results in a light spot which is considerably brighter than when no special means is employed to provide thermal isolation of the ZrO₂ filling. Also in this view is shown a plug 86 of metal or other refractory material which serves as a stop for the core material when it is inserted in the tube.

Figure 14:
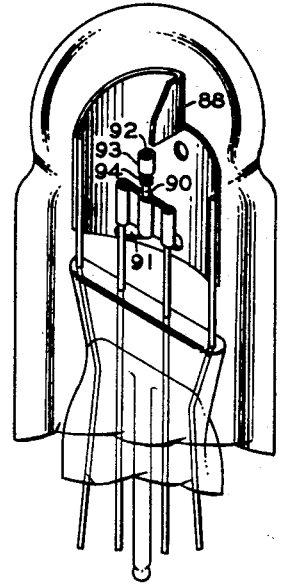
Fig. 14 illustrates further modifications of both anode and cathode in a lamp.

Fig. 14 discloses an edgewise plate construction 88 which gives a wider angle of view and causes the arc to strike along its natural convection line. The figure also discloses a further improvement in the cathode structure in which the oxide core is preformed and baked as a hollow sleeve or tube 90, after which a lead-in wire 91, preferably of zirconium, is inserted therein, which wire extends to the active surface area of the cathode and carries the current thereto.

The zirconium wire initially is caused to extend slightly beyond the end of the zirconium oxide tube, and when the arc strikes during the forming operation the end of the zirconium wire fuses into the zirconium oxide and a small cap 92, usually golden-colored, is formed. The central wire may be composed of some metal other than zirconium, for example, tantalum or tungsten, although the best results have been obtained with zirconium wire. A small sleeve of beryllium oxide or thorium oxide 93 or other heat insulating material having a high melting point, surrounds the zirconium oxide tubing at the active end of the cathode. A small coil 94 of fine tungsten wire may be inserted between the zirconium oxide tubing and the sleeve 93 thereby to prevent the two oxides from fusing together. The beryllium oxide or thorium oxide does not reduce to the metal of the oxide during operation of the lamp, and serves to hold the heat in around the zirconium oxide and thereby greatly increase the efficiency of the light source.

Figure 15:
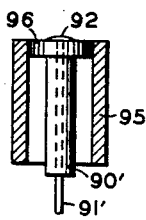
Figs. 15 to 18 show details of alternative forms of cathodes either of which is especially adapted for use in the modification of Fig. 14.
Figure 16:
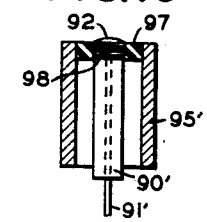

Fig. 15 illustrates a cathode construction in which the zirconium oxide tube 90' is substantially surrounded by a sleeve 95 of tantalum or other suitable metal, the latter sleeve being separated from the zirconium tubing by a short sleeve 96 of tantalum. Fig. 16 shows the use of a thorium oxide or a beryllium oxide sleeve or washer 97 which is inserted between the outer sleeve 95' and the zirconium oxide tubing 90'. A coil 98 of tungsten wire may be inserted between the oxide washer or sleeve 97 and the oxide tubing 90' to prevent the oxides from fusing together.

Figure 17:
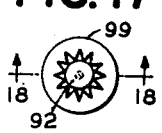
Figure 18:
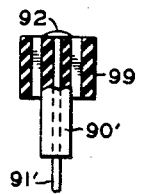

Figs. 17 and 18 are plan and sectional views, respectively, and disclose the use of an outer sleeve 99 of beryllium oxide or thorium oxide which, as seen in Fig. 17, is caused to be corrugated or star-shaped on the inner wall thereof by means of a core in an extruder when the sleeve is being formed, thereby giving a reduced contact surface with the oxide tubing 90'. This tends to prevent fusing of the two oxides, and also provides spaces which reduce thermal conduction from the tube 90'. If desired, the inner walls of sleeves 93 and 97 of Figs. 14 and 16 may similarly be corrugated or star-shaped to give a reduced contact surface with the tungsten coil.

The zirconium oxide tubing comprising the core 90' preferably is made porous when it is preformed, thereby to reduce further its thermal conductivity. This may readily be done as follows: Ammonia is added to a small quantity of wheat flour to keep it from souring and hardening, and after it jells it is permitted to stand for a number of hours. Then zirconium oxide with about 2% by weight of talc is ground up very fine so that it will pass through a 100-mesh screen. This is added to the jell and kneaded until it is plastic, and then is passed through an extruder having a smooth core to form tubing. When the tubing is baked either in a furnace or in an electric arc, the flour is converted to volatile hydrocarbons. The gases are driven off by the heating and the body of the tubing left slightly porous. Any other suitable method of increasing the porosity of the zirconium tubing may of course be employed. With the porous construction the light spot is more constant and is approximately twice the area of the constructions in which the zirconium oxide was not made porous, and thus substantially four times as much light may be obtained from a given size lamp, while the total amount of modulated light is correspondingly increased.

Figs. 19 and 20 disclose modulating circuits for concentrated arc lamps of different sizes, together with starting circuits for the lamps. The arrangement shown in Fig. 19 is especially adapted for larger size lamps where the plate current through the modulator tube is not sufficient to supply the direct current necessary for operating the concentrated arc lamp. A source of direct current supply is shown at the right-hand portion of the figure, the supply passing through current limiting resistances 110 and inductances 112. Bridged across the circuit is a starting switch 114 and the arc discharge lamp 116. Another switch 117 is adapted to engage either of three contact terminals 1, 2 and 3. Contact terminal 1 is the position of switch 117 when the tube 116 is started; by momentarily closing and then opening switch 114, an inductive surge of high potential from inductances 112 is applied to the lamp 116 and provides starting potential for the lamp, after which the lamp remains in operation with the switch 114 in the open position indicated on the drawing. Switch 117 is then moved to its contact 2, at which time resistance 118 is connected in series with a blocking condenser 120 and the secondary winding of an impedance matching transformer 122, the resistance timing the charge of the condenser and limiting the instantaneous current drawn to prevent extinguishing the tube. The condenser 120 is charged from the direct current source through the resistance 118, the condenser serving to keep direct current out of the winding of transformer 122. When switch 117 is moved to position 3, which is the normal operating position for the modulating circuit of the lamp 116, the light emitted by the lamp may be modulated by modulator tube 130, the grid of the modulator tube having applied thereto any desired source of modulating potential which, as indicated at the left-hand side of the circuit, may be alternating in character. A cathode biasing resistance 134 is connected to the cathode of the modulator tube, the resistance being shunted by a bypass condenser 136. A resistance 132 bridged across the signal input circuit applies the biasing potential to the grid of tube 130, the plate circuit of the tube being connected through the primary winding of the coupling transformer 122, this transformer being employed for impedance matching to step down from the comparatively high impedance modulator output circuit to the comparatively low impedance input circuit to the lamp. Any suitable type of modulating circuit other than that disclosed may, of course, be employed to modulate the light emitted by the arc discharge tube 116.

Fig. 20 shows a starting circuit which may be employed with smaller size lamps, for example, a 2-watt lamp, in which the plate circuit through the modulator tube 130' is sufficient to supply the direct current necessary for maintaining the arc in the lamp 116'. The starting circuit for the lamp comprises a source of direct current 138, and the circuit includes the primary winding of a spark coil 140 which has self-interrupting contacts 141. A condenser 142 is bridged across the contacts to minimize arcing. The circuit through the primary winding of the spark coil includes an armature and break contact 145 of a relay 144, so that when the relay is energized during operation of the lamp, the spark coil is disabled. The secondary winding of the spark coil 140 has included in its circuit an air gap 147 and the arc discharge lamp 116'. After the lamp has been started by the high voltage spark supplied by the spark coil 140, the relay 144 automatically operates to disconnect the starting circuit, and the lamp is in condition for modulation by the tube 130'. A condenser 149 is provided for the purpose of bypassing the modulator plate-circuit audio frequency currents around the power supply. Elements of the modulator circuit corresponding to those of Fig. 19 are indicated by similar reference numerals with prime marks added thereto.

Figs. 21 to 23 illustrate various desirable characteristics of one embodiment of our lamp, with a gas filling substantially of argon at a pressure of approximately one atmosphere. In Fig. 21 the ordinates represent brilliance in candles per cm.$^2$, and the abscissas represent watts input to the lamp; the brilliancy of the cathode spot in the arc, which is represented by the curve 160, is many times greater than that of incandescent tungsten, and many times brighter than the cathode terminal of a thermionic arc of types heretofore known. Moreover, the brilliancy of the arc of the instant invention continues to increase as the power is increased and is perfectly stable and constant so long as the current remains constant. The arc may be continued with the maximum power input for which the lamp is adapted, as determined by the size of the lamp, for indefinite periods without destruction of the cathode, since no substantial sputtering or wearing away of the cathode is discernable after several hundred hours of operation.

Fig. 22 shows the volt-ampere characteristics of the arc, with two different sizes of lamps, the curves having been plotted on logarithmic graph paper. Curve 162 shows these characteristics with respect to a smaller lamp, for example, a 10 watt size, and curve 163 shows these characteristics with respect to a larger lamp, such as 100 watt size. The same desirable volt-ampere characteristics obtain in both cases, and irrespective of the size of the lamps.

Fig. 23 represents the spectral characteristic of the arc discharge lamp with a gas filling principally of argon. The ordinates represent, in arbitrary units, the energy per unit wave length, and the abscissas represent wave length in Angstroms. The spectral distribution curve 165 shows a mixture of gas lines which range, for argon, from 5607 to 8521 Angstroms, and the energy radiated is concentrated in the near infrared region of the spectrum from 7500 to 9000 Angstroms. The radiation obtained with argon, and argon with krypton in variable amounts of each, is especially useful in the projection of light beams for signaling with a photocell receiver, since the ordinary caesium photocell is particularly sensitive to the near infrared portion of the spectrum. Moreover, such a beam is almost invisible and can be made invisible by utilizing filters which pass the infrared and block the radiation in the visible region, this being a distinct advantage for signaling or protective purposes.

In Fig. 24 the curve 168 illustrates the brightness ratio, as compared to a tungsten ribbon filament lamp operating at 2950° K., for various wave lengths in microns of the light emitted by the lamp.

Fig. 25 shows the relation between the brilliance of the light beam, the current density in the arc stream, and the arc drop, for various degrees of gas pressure within the envelope of the lamp. The brilliance, shown by curve 170, is expressed in candles per 1/100 of a square centimeter; the current density, shown by curve 171, is expressed in amperes per 1/10 of a square centimeter; the arc drop, shown by curve 172, is expressed directly in volts; and the gas pressure in centimeters of mercury.

In Fig. 26 the curve 174 shows the value of modulated light output of the lamp (expressed in arbitrary units) for various degrees of gas pressure expressed in pounds per square inch. The graph shows that the amount of modulated light increases greatly with an increase in pressure; it may be more than doubled by increasing the gas pressure of argon or krypton from one to ten atmospheres.

Fig. 27 shows, by means of eight curves 175 to 175', the modulation ratio of the lamp at various gas pressures from 0 pound to 150 pounds, with the frequency expressed in kilocycles per second.

The active or electron emitting area of the cathode material 11 from which current flows to the arc is difficult to measure because it is so minute, but the current density in this area is many times greater than it was thought possible to attain on the cathode in a thermionic arc without rapid volatilization of the cathode material. An important characteristic of the arc obtainable in accordance with the instant invention is the high current density that is attained at the cathode terminal without substantial disintegration of the cathode material during a long period of time. For example, lamps of the sizes illustrated in the drawings will be found to have an operating life of many hundred hours or greater. On account of the high intrinsic brilliancy of the cathode spot in the arc obtainable with the lamp, the lamp is of particular value as a light source in which a highly concentrated point source of light is desired and in which any wander of the arc is undesirable.

The envelope of the lamp contains a quantity of any suitable gas or vapor or mixture thereof, as hereinbefore stated, depending upon the color or type of radiation desired, and the pressure may vary depending upon the purpose for which the lamp is to be used, from that of 2 or 3 centimeters up to several atmospheres, for example, up to 10 atmospheres. In general, the brilliancy or intensity of the light increases with increased pressure up to several atmospheres.

The lower limit of the gas pressure above set forth is fixed by the requirement that it must be sufficiently high to cause the discharge to assume the shape of a stable concentrated arc as distinguished from a glow discharge. A pressure somewhat higher than the lower limit mentioned is usually desirable, normally one atmosphere, and for some uses the operating pressure of the gas filling should be several atmospheres or more, and may be as high as permitted by the structural limitations of the envelope and seals.

There is a dense positive-ion space-charge sheath very near the surface of the cathode. This space-charge sheath, being very close to the surface of the cathode and having a voltage gradient that is very large, produces an extremely high electric field at the surface which may draw electrons from the cathode by the so-called "field emission" mechanism. It is also thought that this same field causes the eruption from the cathode surface of ions which form an exceedingly thin cloud above the cathode and are immediately drawn back to the cathode. This cloud of highly excited ions and electrons appears to be one of the sources of the intense radiation produced by the lamp. Under suitable conditions favorable to the maintenance of the arc it is found that, once the crater is formed in the manner hereinbefore stated, the surface of the cathode is not pitted during a prolonged period, and the useful life of the cathode is much greater than that of the ordinary cathode operating with thermionic emission.

While it is impossible to predict more than a few of the many specific uses which will be found for these new lamps, it is thought that many of them can be put into three general classifications. The first is the use of concentrated arcs as point sources. Of course, there is no such thing as a true point source for if it has no area, it must of necessity be infinitely bright. The smaller sizes of concentrated arcs are a close approach, however, to point sources and many interesting and useful things can be done with them. Since the light rays radiate from what is almost a single point, the lamps can be used to throw very sharp shadows and used as lensless enlargers. Also, oblique projections may be made with the point source; for example, distorted views of maps readily may be obtained thereby to facilitate identification of a geographical area when approaching the same, as in aerial navigation. A small concentrated arc lamp makes an excellent source with which to test lenses, adjust optical devices and demonstrate lens aberrations and other optical phenomena. Caustics are produced when point source lamps are placed slightly off the axis and inside the principal focus of two short focus plano convex condensing lenses. A lens designer would need a lot of time to calculate these figures. Many interesting and instructive demonstrations and tests can be made with these brilliant point sources.

A second general field of application of concentrated arc lamps is their use in conjunction with lenses. With a point source at the principal focus of a condensing lens, since the source is so small, the rays leaving the lens are almost exactly parallel. Such an arrangement makes an unusual contact printer for photography in which close contact between the negative and print are not necessary. The advantage of the parallel rays becomes more marked as the distance between the negative and print are increased.

A use of point source lamps which has even wider application is the case where the point source is used as the source of illumination in optical systems. In a photographic enlarger system, since the source is a point, the rays leaving the condenser are substantially parallel. Thus, the ray passing through a given point on the negative or film goes on to strike the enlarging lens at only that point on the lens and passes through the lens to form the image on the screen. The same sequence is followed by the rays passing through each point of the film, the important fact being that there is but little scattering of the rays at the film so the light from each microscopically small element of the film passes through only one equally small area of the lens. Thus for each elementary area the lens acts as if it were stopped down to an extremely small aperture F200 or less, and forms an image having the extreme sharpness and depth of focus which corresponds to such an aperture, but there is not the corresponding loss of light, for the whole lens is working. This explains why it is that when point source lamps are used with optical devices, images are formed which have unusual definition and depth of focus.

In actual applications, the point source is so positioned in respect to the condensing lens that the rays converge in leaving the condenser. This arrangement results in exactly the same stopping effect as before and has the advantage that the enlarging lens need not be as large as the negative.

The third general field of application of concentrated arc lamps is in projection. The problem in many such systems is to get the maximum amount of light from the source, through a small opening such as the film gate and on through the projection lens onto the screen. Optically, the way to get maximum light through a small opening is to image the source at the opening or film gate. Since the concentrated arc has a uniformly brilliant disc of light, its image when placed at the film gate results in a uniformly illuminated screen. This adjustment cannot be used when a tungsten filament projection lamp is employed. In this case, the projector must be set up so the coils of hot tungsten are imaged not at the film gate but in front of the projection lens. If they were imaged at the film gate the image of the hot coils would appear on the screen. Since so much light is lost at the gate under the adjustments necessary with tungsten filament lamps, the efficiency of transferring light to the screen is low. Concentrated arc lamps can thus be used much more efficiently in such projector systems.

A second factor in favor of the concentrated arc in projection systems of this type is that the screen brightness is a direct function of the source brightness. Since the new lamps are brighter than tungsten filament lamps, they show an advantage from this standpoint, also. As a practical result of these advantages, it was found in a recent test that a 100 watt concentrated arc lamp would put more lumens on the screen through an 8 millimeter film projector than could be obtained when a 500 watt tungsten filament type projection lamp was used.

It has also been discovered that the concentrated arc lamp may be utilized as a source of radio frequency oscillations. These oscillations appear to be plasma oscillations, of the type discussed by Tonks and Langmuir in an article entitled "Oscillations in ionized gases" in The Physical Review for February, 1929, volume 33, pages 199 to 210, published by the American Institute of Physics, New York, N. Y. Tonks and Langmuir reported low energy levels and electrical noise, whereas the oscillations obtained from discharge devices of the instant invention contain much more energy and have a fairly definite frequency. A 2 watt concentrated arc lamp, operating at 40 volts and 50 milliamperes direct current has been found to generate a radio frequency of the order of a megacycle and to produce an average of 3.5 volts with a peak of 12 volts across an impedance of 300 ohms. By means of Lecher wires harmonic frequencies have been detected up to 100 megacycles. Both ionic and electronic oscillations apparently are present at frequencies proportional to the square root of the ionic and electronic densities, and with a gas filling of argon at atmospheric pressure frequencies of the order of thousands of megacycles conceivably are generated. Considerably greater radio frequency power outputs are obtainable from lamps containing a mixture of neon and argon gas. It has been demonstrated that modulation of the light produces modulation of the radio frequency generated by the lamp, and thus it is possible to radiate and receive this modulated signal by means of standard radio equipment.

While an intense concentrated beam of light is obtainable with relatively small operating currents, as hereinbefore set forth, there is no theoretical limit to the amperage of the arc discharge, although it will be understood that the size and heat-radiating capacity of the cathode structure should be increased as the current is increased, and thus the lamp is well suited for use as a rectifier. Auxiliary cooling means, such as radiating fins or cooling liquid, may be employed to increase the current-carrying capacity of the electrode structure in a manner similar to known arrangements which have been employed in connection with the anodes of electric discharge devices.

In addition to its use as a highly concentrated light source, the device may also be employed for various circuit functions such as those of a relay, rectifier, voltage regulator, power tube, and the like, it being understood that suitable known starting or control electrodes for gas tubes and their associated circuits may be used with the device of the invention wherever desirable or necessary.

The results obtained with the concentrated arc discharge device have been proved in practice, and the explanation hereinbefore set forth in regard to the theory and phenomena involved in the operation of the device represents the concensus of a number of eminent physicists and research engineers who have investigated the device, although applicants do not wish to be restricted in this respect.

While there are shown and described herein certain embodiments of the invention, many other and varied forms and uses will present themselves to those versed in the art without departing from the invention, and the invention is, therefore, not limited either in structure or in use except as indicated by the scope of the appended claims.

We claim:

1. A cathode structure for use in an arc discharge device, comprising means for causing the device to operate with an arc of high current density concentrated in a spot adjacent to a restricted active surface area of the cathode and to prevent wander of the arc over the cathode surface, said means comprising a cathode body substantially composed of a material having good electrical conductivity and high melting and volatilization point temperatures, said cathode body having a large mass and high thermal conductivity to prevent it from becoming heated to the stage where it is thermionically emissive to a substantial extent when the discharge device is in operation, and a core embedded in the cathode body, said core having an exposed portion integrally bonded to the cathode body and defining said restricted active surface area, said core at the active surface area being substantially composed of a coalescent mass of a high melting point material having an electronic emissivity at the operating temperature of the arc discharge device to provide a copious supply of electrons due to thermionic emission and field emission mechanism when the device is in operation to support the arc discharge.

2. A cathode structure for use in an arc discharge device, comprising means for causing the device to operate with an arc of high current density concentrated in a spot adjacent to a restricted active surface area of the cathode and to prevent wander of the arc over the cathode surface, said means comprising a cathode body substantially composed of material having a high melting and volatilization point temperatures and having good electrical conductivity and good thermal conductivity with a core embedded therein having an exposed surface portion defining said restricted active surface area, said core at said exposed surface portion being substantially composed of a coalescent mass of electron-emissive material, said active surface area of the coalescent mass having the characteristic of substantially increased electron emissivity relative to that of the material of the body of said core.

3. A cathode structure for use in an arc discharge device, comprising means for causing the device to operate with an arc of high current density concentrated in a spot adjacent to a restricted active surface area of the cathode and to prevent wander of the arc over the cathode surface, said means comprising a cathode body composed of a high melting point metallic substance having a core embedded therein with an exposed surface portion thereof defining said restricted active surface area, said core at said exposed surface portion being substantially composed of a coalescent mass of electron-emissive material, said active surface area of the coalescent mass having the characteristic of substantially increased electron emissivity relative to that of said material of the body of the core, said cathode body having high electrical and thermal conductivity to inhibit thermionic emission except from said restricted area.

4. An arc discharge device comprising an envelop enclosing an anode and a cathode and a gas filling at a pressure higher than several centimeters, said cathode having a restricted fused surface portion formed by an arc of high current density which is concentrated thereon when the device is operating, said fused surface portion comprising a metallic substance having thermionic emission properties and which forms and maintains a molten incandesecnt pool when the device is in operation, and means for greatly increasing the thermionic emission properties of said metallic substance to support said arc of high current density comprising means for maintaining the temperature of said pool considerably above the melting point of said metallic substance, said last named means comprising a body of a refractory substance beneath and supporting said pool and having low thermal conductivity and a melting point above that of said metallic substance.

5. An arc discharge device comprising an envelop enclosing an anode and a cathode and a gas filling at a pressure higher than several centimeters, said cathode having a restricted fused surface portion formed by an arc of high current density which is concentrated thereon when the device is operating, said fused surface portion comprising a metallic compound having thermionic emission properties and which forms and maintains a molten incandescent pool of the metal when the device is in operation, and means for maintaining the temperature of said pool considerably above the melting point of said metal to greatly increase its thermionic emission properties to support said arc of high current density, said means comprising a body of a refractory substance beneath and supporting said pool and having low thermal conductivity and a melting point considerably above that of said metal.

6. An arc discharge device comprising an envelop enclosing an anode and a cathode and a gas filling at a pressure higher than several centimeters, said cathode having a restricted fused surface portion formed by an arc of high current density which is concentrated thereon when the device is operating, said fused surface portion comprising a metallic compound having thermionic emission properties and which forms and maintains a molten incandescent pool of the metal when the device is in operation, and means for maintaining the temperature of said pool considerably above the melting point of said metal to greatly increase its thermionic emission properties to support said arc of high current density, said means comprising a body of said metallic compound beneath and supporting said pool having low thermal conductivity and a melting point considerably above that of said metal.

7. An arc discharge device comprising an envelop enclosing an anode and a cathode and a gas filling at a pressure higher than several centimeters, said cathode having a restricted fused surface portion formed by an arc of high current density which is concentrated thereon when the device is operating, said fused surface portion being substantially composed of a metallic oxide having thermionic emission properties and which reduces and forms a molten incandescent pool of the metal when the device is in operation, and means for maintaining the temperature of said pool considerably above the melting point of said metal to greatly increase its thermionic emission properties to support said arc of high current density, said means comprising a body of said metallic oxide beneath and supporting said pool and having low thermal conductivity and a melting point considerably above that of said metal.

8. An arc discharge device comprising an envelop enclosing an anode and a cathode and a gas filling at a pressure higher than several centimeters, said cathode having a restricted fused surface portion formed by an arc of high current density which is concentrated thereon when the device is operating, said fused surface portion comprising a metallic substance having thermionic emission properties and which forms and maintains a molten incandescent pool when the device is in operation, and means for maintaining the temperature of said pool considerably above the melting point of said metallic substance to greatly increase its thermionic emission properties to support said arc of high current density, said means comprising a body of a refractory substance beneath and supporting said pool and having low thermal conductivity and a melting point considerably above that of said metallic substance, and including other means surrounding the active portion of said cathode for reducing thermal conduction from said active portion.

9. An arc discharge device comprising an envelop enclosing an anode and a cathode and a gas filling at a pressure higher than several centimeters, said cathode having a restricted fused surface portion formed by an arc of high current density which is concentrated thereon when the device is operating, said fused surface portion comprising a metallic compound having thermionic emission properties and which forms and maintains a molten incandescent pool of the metal when the device is in operation, means for maintaining the temperature of said pool considerably above the melting point of said metal to greatly-increase its thermionic emission properties to support said arc of high current density, said means comprising a body of a refractory substance beneath and supporting said pool and having low thermal conductivity and a melting point considerably above that of said metal, the electrodes causing a strong electric field to be established in the vicinity of the cathode whereby a substantial portion of the surface metal or metallic compound that is vaporized during operation of the device becomes ionized and positively charged and returns and condenses on the cathode surface thereby to restore the active surface area.

10. An arc discharge lamp for producing a brilliant concentrated source of light, comprising a sealed envelop having a window portion through which the light beam is to be projected, said envelop enclosing an anode and a cathode and a gas filling at a pressure higher than several centimeters, said cathode comprising a body of zirconium oxide having a restricted fused surface portion formed by reduction of the oxide in an arc of high current density which is concentrated thereon when the lamp is operating, said fused surface portion comprising a molten incandescent pool of zirconium when the lamp is in operation, and means for maintaining the temperature of said pool considerably above the melting point of the zirconium to greatly increase its thermionic emission properties to support said arc of high current density, said means comprising the body of zirconium oxide beneath and supporting said pool.

11. An arc discharge lamp for producing a brilliant concentrated source of light, comprising a sealed envelop having a window portion through which the light beam is to be projected, said envelop enclosing an anode and a cathode and a gas filling at a pressure higher than several centimeters, said cathode comprising a body of zirconium oxide having a restricted fused surface portion formed by reduction of the oxide in an arc of high current density which is concentrated thereon when the lamp is operating, said fused surface portion comprising a molten incandescent pool of zirconium when the lamp is in operation, and means for maintaining the temperature of said pool considerably above the melting point of the zirconium to greatly increase its thermionic emission properties to support said arc of high current density, said means comprising the body of zirconium oxide beneath and supporting said pool and additional means for reducing thermal conduction from the zirconium oxide body.

12. A cathode structure for use in an arc discharge device, comprising means for causing the device to operate with an arc of high current density concentrated in a spot adjacent to a restricted active surface area of the cathode and to prevent wander of the arc over the cathode surface, said means comprising a cathode body substantially composed of a material having good electrical and thermal conductivity and high melting and volatilization point temperatures, said cathode body having an opening and a core embedded in the cathode body and extending substantially to the surface of the cathode body at said opening, the exposed portion of the core defining said restricted active surface area, said core at the active surface portion thereof being substantially composed of a coalescent mass of a zirconium compound having an electronic emissivity at the operating temperature of the arc discharge device which will support the arc discharge.

13. A cathode structure for use in an arc discharge device, comprising means for causing the device to operate with an arc of high current density concentrated in a spot immediately adjacent to a restricted surface area of the cathode and to prevent wander of the arc over the cathode surface, said means comprising a cathode body substantially composed of a material having good electrical and thermal conductivity and high melting and volatilization point temperatures, said cathode body having an opening and a core embedded in the cathode body and extending substantially to the surface of the cathode body at said opening, the exposed end of the core defining said restricted active surface area, said core at the active end portion thereof being substantially composed of a coalescent mass of zirconium oxide.

14. A cathode structure comprising a body substantially composed of a material having high melting and volatilization point temperatures and having good electrical conductivity and good thermal conductivity, said body having an opening and a core embedded in the body and extending substantially to the surface of the body at said opening and forming the active surface area of the cathode, said core at the active surface portion thereof being substantially composed of a body of zirconium in a coalescent mass integrally bonded to the cathode body.

15. A cathode structure comprising a mass of comminuted zirconium material, said mass having a restricted active surface area comprising an outer hard, fused electron-emissive layer of a zirconium compound, and a semi-fused layer of said zirconium material beneath and adjoining said outer layer.

16. A cathode structure comprising a mass of comminuted zirconium material, said mass having a restricted active surface area comprising an outer hard, fused electron-emissive layer of a zirconium compound, a semi-fused layer of said zirconium material beneath and adjoining said outer layer, and a powdered layer of said zirconium material beneath and adjoining said semi-fused layer.

17. A cathode structure comprising a mass of comminuted zirconium oxide, said mass having a restricted active surface area comprising an outer hard, fused electron-emissive layer of a zirconium compound, a semi-fused layer of said zirconium oxide beneath and adjoining said outer layer, and a powdered layer of said zirconium oxide beneath and adjoining said semi-fused layer.

18. A cathode structure for use in an arc discharge device, comprising means for causing the device to operate with an arc of high current density concentrated in a spot adjacent to a restricted active surface area of the cathode and to prevent wander of the arc over the cathode surface, said means comprising a cathode body substantially composed of a material having good electrical and thermal conductivity and high melting and volatilization point temperatures, said cathode body having an opening and a core embedded in the cathode body and extending substantially to the surface of the cathode body at said opening, the exposed portion of the core defining said restricted active surface area, said core at the active surface portion thereof being substantially composed of a coalescent mass of a hafnium compound having an electronic emissivity at the operating temperature of the arc discharge device which will support the arc discharge.

19. A cathode structure for use in an arc discharge device, comprising means for causing the device to operate with an arc of high current density concentrated in a spot immediately adjacent to a restricted surface area of the cathode and to prevent wander of the arc over the cathode surface, said means comprising a cathode body substantially composed of a material having good electrical and thermal conductivity and high melting and volatilization point temperatures, said cathode body having an opening and a core embedded in the cathode body and extending substantially to the surface of the cathode body at said opening, the exposed end of the core defining said restricted active surface area, said core at the active end portion thereof being substantially composed of a coalescent mass of hafnium oxide.

20. A cathode structure comprising a mass of comminuted hafnium material, said mass having a restricted active surface area comprising an outer hard, fused electron-emission layer of a hafnium compound, and a semi-fused layer of said hafnium material beneath and adjoining said outer layer.

21. A cathode structure comprising a mass of comminuted hafnium material, said mass having a restricted active surface area comprising an outer hard, fused electron-emissive layer of a hafnium compound, a semi-fused layer of said hafnium material beneath and adjoining said outer layer, and a powdered layer of said hafnium material beneath and adjoining said semi-fused layer.

22. A cathode structure comprising a mass of comminuted hafnium oxide, said mass having a restricted active surface area comprising an outer hard, fused electron-emissive layer of a hafnium compound, a semi-fused layer of said hafnium oxide beneath and adjoining said outer layer, and a powdered layer of said hafnium oxide beneath and adjoining said semi-fused layer.

23. The method of making a cathode which comprises the steps of forming a cathode body by pressing a mass of comminuted zirconium material in contact with a leading-in electrode, inserting the cathode into an envelope having an anode therein, filling the envelope with a gas, activating the zirconium material by passing a current of sufficient voltage between the cathode and anode until a glow discharge appears on the cathode body, increasing the current flow until a portion of the surface of the cathode body becomes incandescent, continuing the heating by said current until the discharge changes to a concentrated arc, and continuing the concentrated arc discharge until a hard, fused electron-emissive layer is formed in said portion of the surface of the cathode body.

24. In the art of making an arc discharge device comprising a sealed envelope containing spaced electrodes including an anode and a cathode and a gas filling at a pressure in the range of several centimeters to several atmospheres, the method of producing a restricted active surface area on the cathode to which the arc is confined when the device is in operation, said method comprising forming an apertured portion in said cathode, filling said apertured portion with a comminuted electron-emissive material, inserting said electrodes and said gas filling in said envelope and sealing the same, and activating said electron-emissive material by passing a current through the discharge device and increasing the voltage thereof until a glow discharge appears at the end of the cathode structure, increasing the current flow until the end of the cathode structure becomes incandescent, continuing the heating by said current until the discharge changes to a concentrated arc, and continuing the concentrated arc discharge until the comminuted electron-emissive material contained in the apertured portion of the cathode is changed to a coalescent mass having the characteristic of substantially increased electron emissivity relative to that of the material from which it is formed.

25. In the art of making an arc discharge device comprising a sealed envelope containing spaced electrodes including an anode and a cathode and a gas filling at a pressure in the range of several centimeters to several atmospheres, the method of producing a restricted active surface area on the cathode to which the arc is confined when the device is in operation, said method comprising forming a cathode body having an apertured portion filled with a comminuted electron-emissive material, inserting said electrodes and said gas filling in said envelope and sealing the same, and activating said electron-emissive material by passing a current through the discharge device and increasing the voltage thereof until a concentrated arc appears, and continuing the concentrated arc discharge until the comminuted electron-emissive material contained in the apertured portion of the cathode is changed to a coalescent mass whose surface area flows and bonds to the cathode body and has the characteristic of substantially increased electron emissivity relative to that of the material from which it is formed.

WILLIAM D. BUCKINGHAM.
CLARENCE R. DEIBERT.

REFERENCES CITED

The following references are of record in the file of this patent:

UNITED STATES PATENTS

| Number | Name | Date |
| --- | --- | --- |
| 2,251,046 | Gaidies et al. | July 29, 1941 |